United States Patent [19]

Pacifici

[11] 3,912,697

[45] Oct. 14, 1975

[54] LIGHT-SENSITIVE POLYMERS

[75] Inventor: James G. Pacifici, Kingsport, Tenn.

[73] Assignee: Eastman Kodak Company, Rochester, N.Y.

[22] Filed: Apr. 27, 1973

[21] Appl. No.: 355,117

[52] U.S. Cl. ...... 260/79.5 NV; 96/115 P; 260/75 S; 260/75 N; 260/79.5 R; 260/80.81; 260/91.3 VA; 260/209.6; 260/212; 260/233.3 R; 260/240 D

[51] Int. Cl.[2] ...................... C08F 28/00; G03C 1/68

[58] Field of Search ............... 260/79.5 NV, 79.5 R, 91.3 VA; 96/115 R, 115 P; 252/301.2 W; 117/33.5 R, 33.5 T

[56] References Cited

UNITED STATES PATENTS

| | | | |
|---|---|---|---|
| 2,725,372 | 11/1955 | Minsk | 260/91.3 VA |
| 3,274,184 | 9/1966 | Thompson et al. | 252/301.2 W |
| 3,347,694 | 10/1967 | Okubo et al. | 117/33.5 T |
| 3,400,124 | 9/1968 | Okubo et al. | 117/33.5 T |
| 3,560,465 | 2/1971 | Reynolds | 260/91.3 VA |
| 3,704,293 | 11/1972 | Strobel et al. | 117/33.5 T |
| 3,758,462 | 9/1973 | Siegrist et al. | 260/91.3 VA |
| 3,796,705 | 3/1974 | Siegrist | 117/33.5 T |
| 3,825,534 | 7/1974 | Weber et al. | 117/33.5 R |
| 3,830,804 | 8/1974 | Barbee et al. | 117/33.5 T |
| 3,830,848 | 8/1974 | Siegrist | 117/33.5 R |

FOREIGN PATENTS OR APPLICATIONS

| | | | |
|---|---|---|---|
| 1,071,346 | 6/1967 | United Kingdom | 252/301.2 W |

*Primary Examiner*—Ronald W. Griffin

[57] ABSTRACT

A novel class of light-sensitive polymers and their use in photographic reproduction is described. The polymers contain a light-sensitive moiety selected from the group consisting of styrylbenzimidazole, styrylbenzoxazole and styrylbenzothiazole attached to the polymer backbone.

26 Claims, No Drawings

LIGHT-SENSITIVE POLYMERS

This invention relates to photographic reproduction. In a particular aspect it relates to a novel class of light-sensitive polymers and the use of such polymers in the preparation of photographic images.

It is known in the photographic art to reproduce images by processes which involve imagewise exposure of a coating of a radiation-sensitive material, the solubility of which is differentially modified by the action of radiation, and subsequent treatment of the coating with a solvent or solvent system which preferentially removes portions of the coating in accordance with its exposure to light. Such processes have been employed to prepare lithographic printing plates, stencils, photoresists, and similar photomechanical images. Among the radiation-sensitive materials which have been used in such processes are light-sensitive polymers which are insolubilized or hardened on exposure to light. Typical of these radiation-sensitive materials are the cinnamic acid esters of polyvinyl alcohol such as are described in U.S. Pat. No. 2,725,372.

The different applications in which light-sensitive polymers are used requires that such polymers be available with a variety of photographic and physical characteristics. Thus, there is a continual search for novel light-sensitive polymers which improve upon and differ from existing light-sensitive polymers. I have found a novel class of such light-sensitive polymers which have high photographic speed and a wide range of spectral response even in the absence of a sensitizer.

Accordingly, it is an object of this invention to provide a novel class of light-sensitive polymers.

It is a further object of this invention to provide a novel class of light-sensitive polymers having high photographic speed and a wide range of spectral response.

It is a further object of this invention to provide novel light-sensitive polymers which have high photographic speed and which are sensitive to radiation in the visible region of the spectrum in the absence of a sensitizer.

It is another object of this invention to provide photosensitive compositions and elements containing this novel class of light-sensitive polymers.

It is still another object of this invention to provide processes for preparing photomechanical images employing these novel light-sensitive polymers.

The above and other objects of the invention will become apparent to those skilled in the art from the further description of the invention which follows.

In accordance with the present invention there is provided a novel class of light-sensitive polymers which contain a light-sensitive moiety selected from the group consisting of styrylbenzimidazole, styrylbenzoxazole and styrylbenzothiazole attached to the polymer backbone. The point of attachment of the light-sensitive moiety to the polymer backbone is the carboxyl group attached to the styryl nucleus. When the polymer backbone is derived from a hydroxyl-containing polymer, the light-sensitive moiety is attached through a carbonyloxy linkage. When the polymer backbone is derived from a polymer containing reactive amino groups, the attachment is through an amido linkage.

The light-sensitive moieties which are attached to the light-sensitive polymers of this invention can be represented by the following structural formula

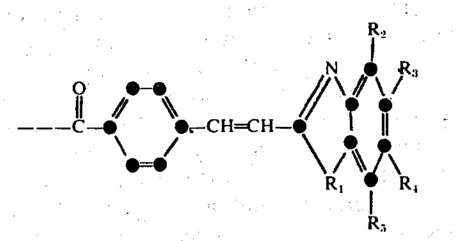

wherein $R_1$ is an oxygen atom, a sulfur atom, or a nitrogen atom containing an alkyl group having 1 to 12 carbon atoms;

$R_2$, $R_3$, $R_4$ and $R_5$ are hydrogen, lower alkyl, i.e., methyl; substituted lower alkyl, i.e., propylene chloride; cycloalkyl, i.e., cyclohexane; substituted cycloalkyl, i.e., 3-methylcyclohexane; aryl, i.e., benzyl; substituted aryl, i.e., 3-chlorobenzyl; lower alkyl aryl, i.e., 3-methylbenzyl; aryl substituted aryl, i.e., diphenyl; alkoxy, i.e., methoxy; amino; carboxy and the substituents $R_2$ and $R_3$, $R_3$ and $R_4$, $R_4$ and $R_5$ combined with the carbon atoms to which they are attached are joined alkylene groups completing a carbocylic ring, i.e., phenyl, naphthyl and the like.

The polymers which form the backbone of the light-sensitive polymers of this invention and to which the light-sensitive moieties are attached include natural and synthetic resins such as hydroxyl-containing polymers, for example, polyvinyl alcohol, polyvinyl alcohol-co-vinyl acetate, polyvinyl alcohol-co-vinyl benzoate, polyvinyl alcohol-co-vinyl acetate-co-vinyl benzoate; polyethers such as epoxy and phenoxy polymers, e.g., the condensation product of a bisphenol, such as diphenylolpropane, with epichlorohydrin; naturally occurring materials such as cellulose, starch, guar, alginic acid, and their partially esterified or etherified derivatives; polyesters of polyhydroxy intermediates such as glycerol and sorbitol which have hydroxyl groups remaining after incorporation in the polymer chain; polymers containing reactive amino groups, for example, aminostyrene; and anthranilic acid polymers such as polyvinyl anthranilate and the like.

The light-sensitive polymers of the present invention are prepared by the reaction of the hydroxy or amino groups on the polymer backbone with an acid halide of one light-sensitive moiety or the acid halide of a mixture of light-sensitive moieties. This reaction can be carried out in a suitable solvent such as a tertiary amine, for example, pyridine, picoline, lutidine, triethylamine, and the like, at room temperature, or at elevated temperatures up to about 100°C.

When the hydroxyl-containing polymer employed is a polyvinyl alcohol, the light-sensitive polymers which have good solubility and other desirable physical properties can be prepared by the procedure described in U.S. Pat. No. 3,560,465, which is incorporated herein by reference. This procedure involves swelling the polyvinyl alcohol in a tertiary amine solvent followed by partial esterification with an aroyl chloride such as benzoyl chloride. The partially aroylated polyvinyl alcohol is then esterified with the photo-sensitive acid chloride, after which any remaining hydroxyl groups optionally can be esterified with aroyl chloride.

In addition to the light-sensitive groups, the polymers of this invention can contain modifying groups such as other light-sensitive groups, such as cinnimates, as well as non-light sensitive groups, such as benzoate, attached to the polymer backbone. Such other groups are often used in modifying the physical properties of the polymer, such as solubility, adhesivity, melting point, and the like. Useful groups include those derived from aliphatic and aromatic carboxylic acids, such as acetic acid, haloacetic acid, propionic acid, isovaleric acid, succinic acid, glutaric acid, adipic acid, sebacic acid, 2-ethylhexanoic acid, decanoic acid, benzoic acid, halobenzoic acids, nitrobenzoic acids, toluic acids, p-ethylbenzoic acid, p-octylbenzoic acid, p-ethoxybenzoic acid, p-amyloxybenzoic acid, 2-naphthoic acid, and the like. These modifying groups can be attached to the polymer prior to addition of the light-sensitive group, as for example, when an acetylated polyvinyl alcohol is used as the polymer backbone, or when the procedure of U.S. Pat. No. 3,560,465, referred to above, is employed to prepare the light-sensitive polymers of this invention. Alternatively, free reactive groups contained on the polymer backbone after addition of the light-sensitive moiety can be esterified with modifying groups such as acid chlorides, or other suitable reactants, of the modifying groups. The modifying group can comprise up to 75% of the groups attached to the polymer backbone. Therefore, from less than 1 to about 50% of the groups attached to the polymer backbone can be light-sensitive groups as defined by the present invention. Preferably, 1 to 25% of the groups attached to the polymer backbone are these light-sensitive moieties.

Coating compositions containing the light-sensitive polymers of this invention can be prepared by dispersing or dissolving the polymer in a suitable organic solvent such as dimethylformamide; ketones such as 4-methyl-2-pentanone, cyclohexanone, etc.; chlorinated hydrocarbon solvents such as chloroform, trichloroethylene, dichloroethane, trichloroethane, tetrachloroethane, etc.; mixtures of these solvents, and the like. Coating compositions can include a variety of photographic addenda utilized for their known purpose, such as agents to modify the flexibility of the coating, agents to modify its surface characteristics, dyes and pigments to impart color to the coating, agents to modify the adhesivity of the coating to the support, and a variety of other addenda known to those skilled in the art.

The polymers of the present invention are useful in a variety of photographic applications to prepare photomechanical images such as lithographic printing plates and photoresists.

Because of the wide range of spectral response and high photographic speed of the light-sensitive polymers of the present invention, it is not necessary to incorporate sensitizers in the photosensitive coating composition containing the light-sensitive polymers of this invention.

The light-sensitive polymers of this invention can be the sole polymeric constituent of the coating composition or another polymer can be incorporated therein to modify the physical properties of the composition and serve as a diluent. For example, phenolic resins, such as thermoplastic Novolac resins, can be incorporated in the composition to improve the resistance of the polymer composition to etchants when it is used as a photoresist. Similarly, hydrophilic polymers such as cellulose and its derivatives, polyalkylene oxides, polyvinyl alcohol and its derivatives, and the like, can be incorporated in the composition to improve the hydrophilic properties of the coating when it is used in the preparation of lithographic printing plates. These other polymeric materials can constitute up to 25% by weight, based on the weight of the light-sensitive polymer, of the coating composition.

Photosensitive elements can be prepared by coating the photosensitive compositions from solvents onto supports in accordance with usual practices. Suitable support materials include fiber base materials such as paper, polyethylene-coated paper, polypropylene-coated paper, parchment, cloth, and the like; sheets and foils of such metals as aluminum, copper, magnesium, zinc, and the like; glass and glass coated with such metals as chromium, chromium alloys, steel, silver, gold, platinum, and the like; synthetic polymeric materials such as polyalkyl methacrylates (e.g., polymethyl methacrylate), polyester film base (e.g., polyethylene terephthalate), polyvinyl acetals, polyamides (e.g., nylon), cellulose ester film base (e.g., cellulose nitrate, cellulose acetate, cellulose acetate propionate, cellulose acetate butyrate), and the like. The optimum coating thickness for a particular purpose will depend upon such factors as the use to which the coating will be put, the particular light-sensitive polymer employed, and the nature of other components which may be present in the coating. Typical coating thicknesses can be from about 0.1 to 10 mils.

Photomechanical images can be prepared with photosensitive elements by imagewise exposing the element to a light source to harden or insolubilize the polymer in exposed areas. Suitable light sources which can be employed in exposing the elements include sources rich in visible radiation and sources rich in ultraviolet radiation, such as carbon arc lamps, mercury vapor lamps, fluorescent lamps, tungsten lamps, photoflood lamps, and the like.

The exposed element can be developed with a solvent for the unexposed, uncrosslinked polymer which is a nonsolvent for the exposed hardened polymer. Such solvents can be selected from the solvents listed above as suitable coating solvents, as well as others known in the art.

The light-sensitive compounds employed in the preparation of the light-sensitive polymers were prepared by procedures previously described in the literature. For example, styrylbenzoxazole derivatives can be prepared according to the procedures described in U.S. Pat. Nos. 3,347,694, 3,400,124, 3,274,184; British Pat. No. 1,071,346; Published German Application No. 1,444,014 and Belgium Pat. Nos. 1,537,442 and 1,397,629. The styrylbenzimidazole derivatives can be prepared according to the procedures described in Belgium Pat. No. 1,576,989. The carboalkoxy or carboxy reference derivatives prepared by these procedures were readily converted to the acid chlorides by reactions illustrated in Example 1. All of the teachings of the above disclosures are incorporated herein by reference.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A substituted styrylbenzoxazole, 4-[2-(5,6-dimethyl-2-benzoxazolyl)vinyl] benzoyl chloride, can be prepared as follows:

A mixture of 300 g. of methyl 4-[2-(5,6-dimethyl-2-benzoxazolyl)vinyl] benzoate, 2,300 ml. of acetic acid, 900 ml. of concentrated sulfuric acid and 700 ml. of water was stirred and refluxed for 3 hours. The mixture was cooled, added to water and the product collected by filtration. It was then washed with water and air dried. The crude product was recrystallized from DMF to give 257 g. of product. DSC showed a major peak at 344°C. with a small shoulder at 333°C.

A mixture of 100 g. (0.34 mole) of the acid, 4-[2-(5,6-dimethyl-2-benzoxazolyl)vinyl] benzoic acid, 100 g. of sodium carbonate, and 600 ml. of thionyl chloride was stirred at room temperature for 2 days. The acid dissolved during this time. The carbonate was removed by filtration and the filtrate added to ether to precipitate the product which was collected by filtration and dried in a vacuum desiccator for 2 days. Isolated was 75 g. (71%) of the desired acid chloride, 4-[2-(5,6-dimethyl-2-benzoxazolyl)vinyl] benzoyl chloride, having a melting point of 216°–217°.

EXAMPLE 2

A substituted styrylbenzothiazole, methyl 4-[2-(2-benzothiazolyl)-vinyl] benzoate, can be prepared as follows:

Methyl p-formylbenzoate (9.0 g., 0.055 mole), 2-methylbenzothiazole (7.4 g., 0.05 mole), dimethyl formamide (DMF) (2.9 g., 0.04 mole), p-toluenesulfonic acid (5.4 g., 0.03 mole) and xylene (85 ml.) were combined and refluxed under a Dean-Stark trap for 4 hours. The reaction mixture was then allowed to stand overnight at room temperature. Methanol (100 ml.) was added and the mixture cooled in an ice-water bath. The product was collected by filtration and dried to give 10 g. (68%) of yellow product. The sample was recrystallized from methanol to give a much lighter colored solid; mp. 168°–169°, U.V. ($CH_2Cl_2$) $\lambda_{max}$ 340 nm, $\epsilon$, 30, 744 $M^{-1}cm^{-1}$.

Anal. calcd. for $C_{17}H_{13}NO_2S$: C, 69.12; H, 4.45; N, 4.74; S, 10.85. Found: C, 69.30; H, 4.24; N, 4.80; S, 10.70.

The substituted styrylbenzothiazole benzoate is converted into the acid chloride according to the procedure of Example 1.

EXAMPLE 3

A mixture of 5.0 g. polyvinyl alcohol (Vinol 523, 12% acetyl) and 75 ml. of dry pyridine was heated on a steam bath overnight. After cooling, 0.32 g. (0.001 mole) of 4-[2-(5,6-dimethyl-2-benzoxazolyl)vinyl] benzoyl chloride was added to the reaction flask and the mixture was heated for 3 hours over a water bath at 50°C. To this mixture was then added 12.5 g. (0.096 mole) of benzoyl chloride and the mixture heated for an additional 3 hours. The mixture was cooled, 600 ml. of acetone added, and the soluble product filtered. The acetone solution was poured into water and the precipitated polymer isolated by filtration. After air drying for 24 hours, the polymer was dissolved in chloroform and precipitated from methyl alcohol. The yield of dried product was 9.2 g. Fluorescence analysis ($\lambda_{max}$ excitation 366 nm.; $\lambda_{max}$ emission 450 nm.) confirmed the presence of the styrylbenzoxazole moiety. Both infrared and NMR. showed that less than 0.2% of —OH groups were present.

EXAMPLE 4

The procedure is the same as described in Example 3, except that 3.2 g. (0.01 mole) of 4-[2-(5,6-dimethyl-2-benzoxazolyl)vinyl] benzoyl chloride was employed. Fluorescence analysis confirmed the presence of 0.01 mole of the styrylbenzoxazole moiety.

EXAMPLE 5

Five percent acetone solutions of the polymer prepared according to Example 3, were prepared. Films (0.5, 1 and 3 mil) were cast on rolled steel plates with a Garner Film Casting Knife and were allowed to dry in the dark before irradiation. Samples were exposed through a negative mask to a 250-watt medium-pressure Hanovia mercury lamp, employing a Corex filter. The exposure time for all samples was 1 minute and the samples were then developed for 5 minutes in acetone. A comparison between the developed images showed that sufficient cross-linking occurred for each film thickness to render the exposed portions highly insoluble.

EXAMPLE 6

Films of 1.0 mil thickness of the polymer prepared in Example 4 were cast from benzene/acetone (50/50, v/v) according to the procedure of Example 5. These film samples, were then exposed for 30 seconds according to the procedure of Example 5 and produced an image.

EXAMPLE 7

A mixture of 5.0 g. polyvinyl alcohol (Vinol 523, 12% acetyl), 100 ml. of dry pyridine and 0.30 g. (0.001 mole) of 4-[2-(1-ethyl-2-benzimidazolyl)vinyl] benzoyl chloride was heated for 4 hours on a steam bath. To this mixture was then added 12.5 g. (0.096 mole) of benzoyl chloride and the mixture heated for an additional 4 hours. The mixture was cooled, 600 ml. of acetone added, and the soluble product filtered. The acetone solution was poured into water and the precipitated polymer isolated by filtration. After air drying for 24 hours, the polymer was dissolved in acetone, precipitated from water, isolated and dried in vacuo at 60°C. The yield of product was 10.3 g. Fluorescence analysis confirmed the presence of the styrylbenzimidazole moiety.

EXAMPLE 8

Five percent acetone solutions of the polymer prepared in Example 7 were prepared. Films (1 mil) were then cast on silica plates with a Garner Film Casting Knife were allowed to dry in the dark prior to irradiation. Samples were exposed through a negative mask to a 250-watt medium pressure General Electric mercury lamp, employing to Corex filter. An exposure time of less than 10 seconds was sufficient to render the exposed portions insoluble in the developer solvent acetone.

EXAMPLE 9

The following polymer compositions were prepared by reacting polyvinyl alcohol (Vinol 523, 12% acetyl) according to the procedure of Example 3 with benzoyl chloride or cinnamoyl chloride and a light-sensitive moiety in the following amounts.

| | | | | |
|---|---|---|---|---|
| I. | 12% acetate | 52.8% benzoate | 35.2% | 4-[2-(5,6-dimethyl-2-benzoxazolyl)vinyl] benzoate |
| II. | 12% acetate | 68% benzoate | 20% | 4-[2-(5,6-dimethyl-2-benzoxazolyl)vinyl] benzoate |
| III. | 12% acetate | 68% benzoate | 20% | 4-[2-(1-ethyl-2-benzimidazolyl)vinyl] benzoate |
| IV. | 12% acetate | 83% cinnamate | 5% | 4-[2-(5,6-dimethyl-2-benzoxazolyl)vinyl] benzoate |
| V. | 12% acetate | 68% benzoate | 20% | 4-[2-(2-benzothiazolyl)vinyl] benzoate |

Silicon wafers were coated with these polymers and the coated compositions tested for relative sensitivity according to the method developed by Minsk and coworkers as described in L. M. Minsk et al., *J. Appl. Polymer. Sci.* 2, 302 (1959).

Table 1

| Polymer | Spectral Response | Relative Speed |
|---|---|---|
| 1. Polyvinylcinnamate | 270–360 | 1 |
| 2. I | 270–460 | >10,000 |
| 3. II | 270–460 | >10,000 |
| 4. III | 270–460 | 8,000 |
| 5. IV | 270–360 | 300 |
| 6. IV | 270–460 | 2,300 |
| 7. V | 270–460 | 9,000 |

The invention has been described in detail with particular reference to certain preferred embodiments thereof, but it will be understood that variations and modifications can be effected within the spirit and scope of the invention.

I claim:

1. A light-sensitive polymer which comprises a polymer having a light-sensitive moiety selected from the group consisting of styrylbenzimidazole, styrylbenzoxazole and styrylbenzothiazole attached to the polymer backbone.

2. A light-sensitive polymer according to claim 1 wherein the light-sensitive moiety has the formula

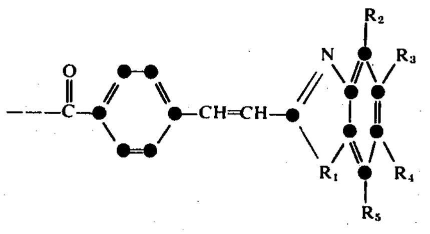

wherein $R_1$ is an oxygen atom, a sulfur atom, or a nitrogen atom containing an alkyl group having 1 to 12 carbon atoms;

$R_2$, $R_3$, $R_4$ and $R_5$ are hydrogen, alkyl, substituted alkyl, cycloalkyl, substituted cycloalkyl, aryl, substituted aryl, alkyl aryl, aryl substituted aryl, alkoxy, amino, carboxy and the substituents $R_2$ and $R_3$, $R_3$ and $R_4$, $R_4$ and $R_5$ combined with the carbon atoms to which they are attached are joined alkylene groups completing a carbocyclic ring.

3. A light-sensitive polymer according to claim 2 wherein said $R_1$ is a nitrogen atom containing an alkyl group having 1 to 12 carbon atoms.

4. A light-sensitive polymer according to claim 3 wherein said light-sensitive styrylbenzimidazole moiety is 4-[2-(1-ethyl-2-benzimidazolyl)vinyl] benzoyl.

5. A light-sensitive polymer according to claim 2 wherein said $R_1$ is an oxygen atom.

6. A light-sensitive polymer according to claim 5 wherein said light-sensitive styrylbenzoxazole moiety is 4-[2-(5,6-dimethyl-2-benzoxazolyl)vinyl] benzoyl.

7. A light-sensitive polymer according to claim 2 wherein said $R_1$ is a sulfur atom.

8. A light-sensitive polymer according to claim 7 wherein said light-sensitive styrylbenzothiazole moiety is methyl 4-[2-(2-benzothiazolyl)vinyl] benzoyl.

9. A light-sensitive film-formable polymer having attached to the polymer backbone, which is a residue of a polymer selected from the group of hydroxyl containing polymers and reactive amino-containing polymer, a light-sensitive moiety selected from the group consisting of styrylbenzimidazole, styrylbenzoxazole and styrylbenzothiazole, the light-sensitive moiety being attached to the backbone through a carbonyloxy group when the backbone is the residue of a hydroxyl-containing polymer and through an amido group when the backbone is the residue of a reactive amino-containing polymer.

10. A light-sensitive film-formable polymer according to claim 9 wherein the light-sensitive moiety has the formula

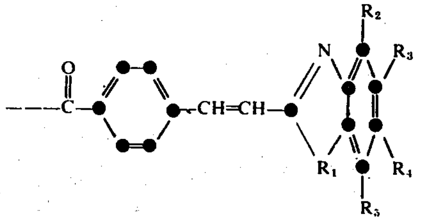

wherein $R_1$ is an oxygen atom, a sulfur atom, or a nitrogen atom containing an alkyl group having 1 to 12 carbon atoms;

$R_2$, $R_3$, $R_4$ and $R_5$ are hydrogen, alkyl, substituted alkyl, cycloalkyl, substituted cycloalkyl, aryl, substituted aryl, alkyl aryl, aryl substituted aryl, alkoxy, amino, carboxy and the substituents $R_2$ and $R_3$, $R_3$ and $R_4$, $R_4$ and $R_5$ combined with the carbon atoms to which they are attached are joined alkylene groups completing a carbocylic ring.

11. A light-sensitive film-formable polymer according to claim 10 wherein said hydroxyl containing polymer is a polyvinyl alcohol polymer.

12. A light-sensitive film-formable polymer according to claim 11 wherein said $R_1$ is a nitrogen atom containing an alkyl group having 1 to 12 carbon atoms.

13. A light-sensitive film-formable polymer according to claim 12 wherein said light-sensitive styrylbenzimidazole moiety is 4-[2-(1-ethyl-2-benzimidazolyl)vinyl] benzoyl.

14. A light-sensitive film-formable polymer according to claim 11 wherein said $R_1$ is an oxygen atom.

15. A light-sensitive film-formable polymer according to claim 14 wherein said light-sensitive styrylbenzoxazole moiety is 4-[2-(5,6-dimethyl-2-benzoxazolyl)-vinyl] benzoyl.

16. A light-sensitive film-formable polymer according to claim 11 wherein said $R_1$ is a sulfur atom.

17. A light-sensitive film-formable polymer according to claim 16 wherein said light-sensitive styrylbenzothiazole moiety is methyl 4-[2-(2-benzothiazolyl)vinyl] benzoyl.

18. A light-sensitive film formed from a polymer having attached to the polymer backbone, which is a residue of a polymer selected from the group of hydroxyl containing polymers and reactive amino-containing polymer, a light-sensitive moiety selected from the group consisting of styrylbenzimidazole, styrylbenzoxazole and styrylbenzothiazole, the light-sensitive moiety being attached to the backbone through a carbonyloxy group when the backbone is the residue of a hydroxyl-containing polymer and through an amido group when the backbone is the residue of a reactive amino-containing polymer.

19. A light-sensitive film formed from a polymer according to claim 18 wherein the light-sensitive moiety has the formula

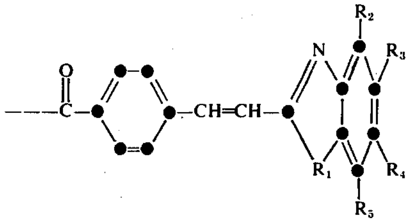

wherein $R_1$ is an oxygen atom, a sulfur atom or a nitrogen atom containing an alkyl group having 1 to 12 carbon atoms;

$R_2$, $R_3$, $R_4$ and $R_5$ are hydrogen, alkyl, substituted alkyl, cycloalkyl, substituted cycloalkyl, aryl, substituted aryl, alkyl aryl, aryl substituted aryl, alkoxy, amino, carboxy, and the substituents $R_2$ and $R_3$, $R_3$ and $R_4$, $R_4$ and $R_5$ combined with the carbon atoms to which they are attached are joined alkylene groups completing a carbocylic ring.

20. A light-sensitive film according to claim 19 wherein said hydroxyl containing polymer is a polyvinyl alcohol polymer.

21. A light-sensitive film according to claim 20 wherein said $R_1$ is nitrogen containing an alkyl group having 1 to 12 carbon atoms.

22. A light-sensitive film according to claim 21 wherein said light-sensitive styrylbenzimidazole moiety is 4-[2-(1-ethyl-2-benzimidazolyl)vinyl] benzoyl.

23. A light-sensitive film according to claim 20 wherein said $R_1$ is an oxygen atom.

24. A light-sensitive film according to claim 23 wherein said light-sensitive styrylbenzoxazole moiety is 4-[2-(5,6-dimethyl-2-benzoxazolyl)vinyl] benzoyl.

25. A light-sensitive film according to claim 20 wherein said $R_1$ is a sulfur atom.

26. A light-sensitive polymer according to claim 25 wherein said light-sensitive styrylbenzothiazole moiety is methyl 4-[2-(2-benzothiazolyl)vinyl] benzoate.

* * * * *